US005511907A

United States Patent [19]

Tabasco

[11] Patent Number: 5,511,907

[45] Date of Patent: Apr. 30, 1996

[54] MOBILE INJECTION DEVICE AND METHOD FOR DELIVERY OF REMEDIATION MATERIALS TO UNDERGROUND CONTAMINATED SOILS AND WATER

[76] Inventor: Joseph J. Tabasco, 308 Roberts Dr., Somerdale, N.J. 08083

[21] Appl. No.: 439,640

[22] Filed: May 12, 1995

[51] Int. Cl.$^6$ ................................ B09B 3/00; B09C 1/10; C12N 1/26

[52] U.S. Cl. ............................ 405/128; 166/246; 175/67; 210/610; 210/747

[58] Field of Search .................................... 405/128, 129, 405/258, 263, 269, 52; 175/67, 424; 210/747, 610, 922; 166/246; 435/262, 262.5

[56] References Cited

U.S. PATENT DOCUMENTS

| | | | |
|---|---|---|---|
| 2,345,816 | 4/1944 | Hays | 175/67 X |
| 2,768,949 | 10/1956 | Hewey | 210/6 |
| 4,401,569 | 8/1983 | Jhaveri et al. | 210/610 |
| 4,749,491 | 6/1988 | Lawes et al. | 210/610 |
| 4,844,807 | 7/1989 | Manchak, Jr. | 210/682 |
| 4,850,440 | 7/1989 | Smet | 175/67 |
| 5,032,042 | 7/1991 | Schuring et al. | 405/128 X |
| 5,037,240 | 8/1991 | Sherman | 405/128 |
| 5,039,415 | 8/1991 | Smith | 210/611 |
| 5,061,119 | 10/1991 | Balthaus et al. | 405/128 |
| 5,120,160 | 6/1992 | Schwengel | 405/128 |
| 5,133,625 | 7/1992 | Albergo et al. | 405/263 |
| 5,209,604 | 5/1993 | Chou | 405/128 |
| 5,221,159 | 6/1993 | Billings et al. | 405/128 |
| 5,277,518 | 1/1994 | Billings e tal. | 405/128 |
| 5,286,141 | 2/1994 | Vigneri | 405/128 |
| 5,299,887 | 4/1994 | Eusleg | 405/128 |
| 5,334,533 | 8/1994 | Colasito et al. | 435/264 |

*Primary Examiner*—Stephen J. Novosad

*Attorney, Agent, or Firm*—John H. Scarborough; Robert R. Mallinckrodt

[57] ABSTRACT

An apparatus and method for delivery of remediation material to treat underground contaminated soils and water having a hollow cylindrical pipe through which both to apply water under air pressure and to deliver the remediation materials. Tanks of water, nutrients, and bacteria are typically mounted on the platform of a flat-bed truck or on a trailer which is transported by means of a hitch. A compressor is connected to the tanks of water, nutrients, and bacteria to provide pressurized air to create flow of water, nutrients, and bacteria from the tanks to the underground contaminated soils and water.

17 Claims, 3 Drawing Sheets

MOBILE INJECTION DEVICE AND METHOD FOR DELIVERY OF REMEDIATION MATERIALS TO UNDERGROUND CONTAMINATED SOILS AND WATER

BACKGROUND OF THE INVENTION

1. Field

This invention is in the field of mobile devices for the delivery of remediation materials to underground contaminated soils and water.

2. State of the Art

Contamination of underground soils and water has become a pervasive problem in the United States today. In order to maintain the viability of industry, commerce, and agriculture, the need to cleanup existing underground contamination has become paramount.

There are various devices and methods to treat underground contaminates by a mobile approach. Albergo, U.S. Pat. No. 5,133,625, discloses a mobile device which utilizes a cylindrical push rod mechanism to penetrate soil to deliver materials to remediate underground contamination. Balthaus, U.S. Pat. No. 5,061,119, discloses a rotating drill to loosen subsurface soil and to deliver materials to remediate underground contamination.

However, these devices, while incorporated into a mobile unit, are relatively complex and require expensive and sophisticated equipment.

OBJECTS OF THE INVENTION

It is an object of this invention to provide a device and method which are economic, effective, and expedient to effect remediation of underground contaminated soils and water.

It is a further object of this invention to provide a device which can be easily replaced if damaged and is inexpensive to manufacture.

SUMMARY OF THE INVENTION

This invention includes an apparatus and method having a hollow cylindrical pipe as a simple and inexpensive means for the delivery of remediation materials to the site of underground contaminated soils and water. The cylindrical pipe is used both to drill into soil by application water under air pressure and to deliver the remediation materials, also under air pressure.

Water, nutrients, and bacteria are pumped from tanks typically mounted on the platform of a truck or on a trailer to the cylindrical pipe through a valve bank and manifold assembly. The valve bank is operated manually to select flow of water, nutrients, and bacteria as desired. A compressor is connected to the tanks of water, nutrients, and bacteria to apply pressurized air to the tanks thereby creating flow of water, nutrients, bacteria, respectively, from the tanks.

BRIEF DESCRIPTION OF THE DRAWINGS

The best mode presently contemplated for carrying out the invention in actual practice is shown in the accompanying drawings, in which.

DETAILED DESCRIPTION OF THE ILLUSTRATED EMBODIMENT

Figure 1:
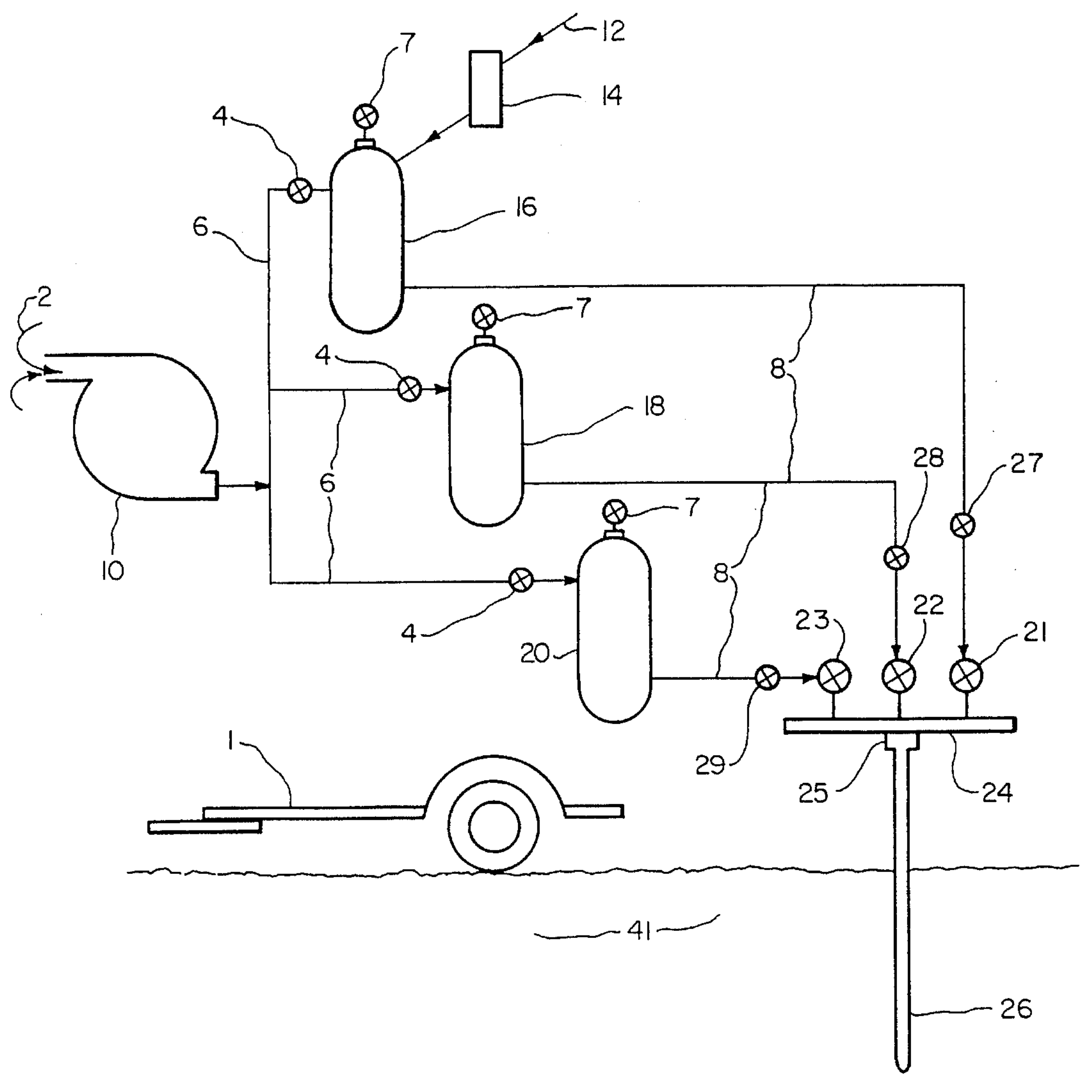
FIG. 1 is a schematic drawing of the complete mobile unit showing tanks which are typically mounted of the platform of a truck or on a trailer which is transported by means of a hitch.

In the illustrated embodiment, the remediation apparatus of the invention includes a compressor 10; a pressure tank 16 for holding bacteria; a pressure tank 18 for holding nutrients, and a pressure tank 20 for holding water as shown in FIG. 1. The compressor 10 and tanks 16, 18, and 20 are typically mounted on a vehicle such as a trailer 1, or on the platform of a truck. Pressure hoses 6 extend from the output of compressor 10 to tanks 16, 18, and 20. Three pressure hoses 8 extend from tanks 16, 18, and 20, to manifold valves 21, 22, and 23, respectively, which is attached to a manifold 24. In the illustrated embodiment, the manifold valves 21, 22, and 23 and the manifold 24, form a unit by having the manifold valves 21, 22, and 23 threaded onto lengths of standard pipe, the manifold 24, as a series of three T's. However, the manifold valves could be welded onto the manifold in whatever form is satisfactory as long as they can be manipulated as a unit together. Another set of valves 27, 28, and 29 may be provided between tanks 16, 18, and 20 to manifold valves 21, 22, and 23, each, respectively, through pressure hoses 8. The manifold 24 is connected to one end of a length of hollow cylinder pipe 26. Manifold 24 is preferably removably attached directly to an end of the hollow cylindrical pipe 26. For this purpose, an internally threaded pipe coupling 25 may be welded to manifold 24 and an externally threaded end of the hollow cylindrical pipe 26 threaded into coupling 25. Hoses 8 are flexible and of a length so that cylindrical pipe 26 and attached manifold 24 are free to be moved a distance away from tanks 16, 18, and 20 and from any vehicle on which the tanks are mounted. Cylindrical pipe 26 and attached manifold 24 can be moved and manipulated manually by an operator, and manifold 24 can serve as a handle for holding and manipulating the cylindrical pipe 26.

Figure 2:
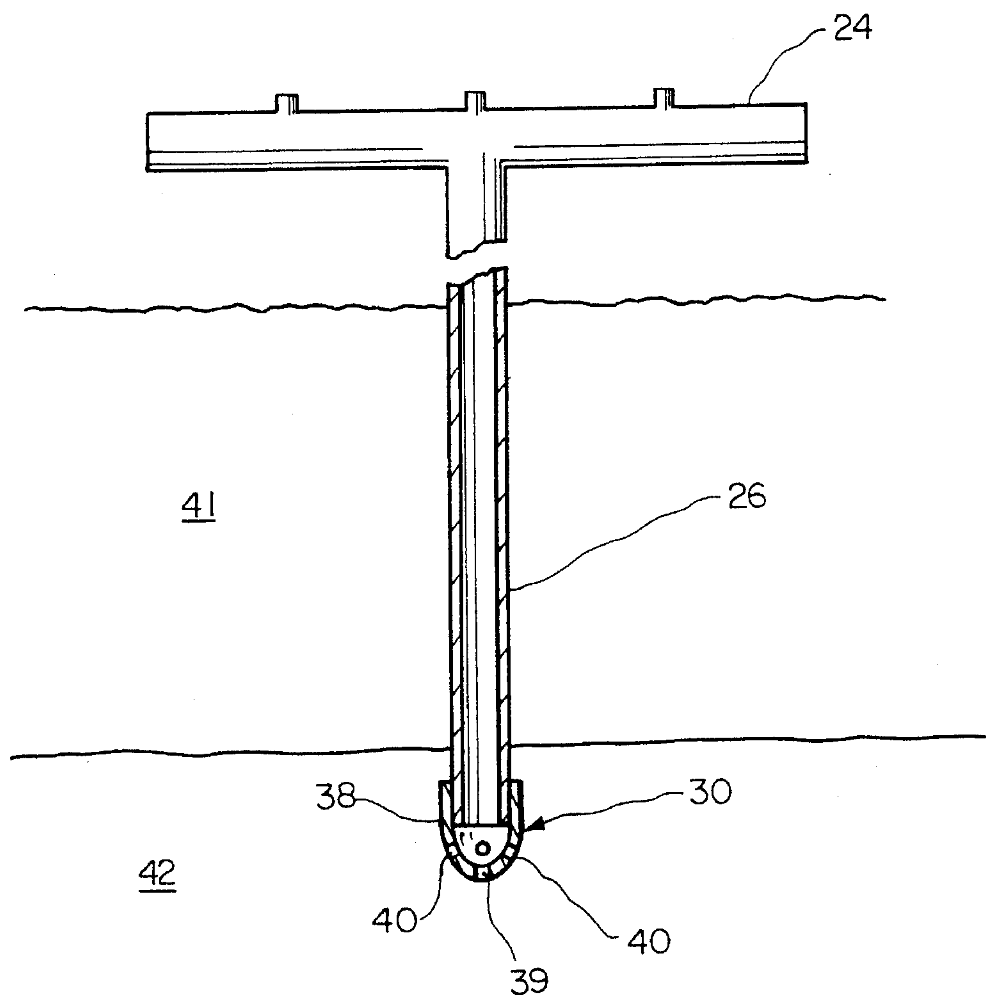
FIG. 2 is a vertical section of the cylindrical pipe which is used both as a drill and as a means for delivering materials to remediate underground contaminated soils and water.
Figure 4:
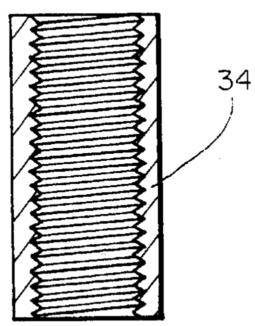
FIG. 4 is a vertical section of the pipe coupler of FIG. 3 taken on the line 4—4 of FIG. 3.
Figure 3:
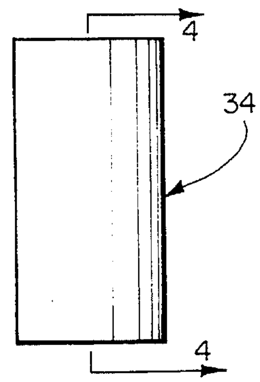
FIG. 3 is a side elevation view of a pipe coupler.
Figure 6:
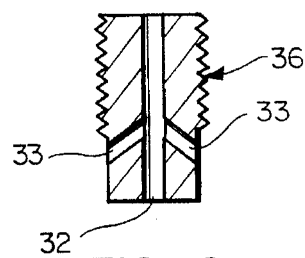
FIG. 6 is a vertical section of the pipe plug of FIG. 5 taken on line 6—6 of FIG. 5.
Figure 5:
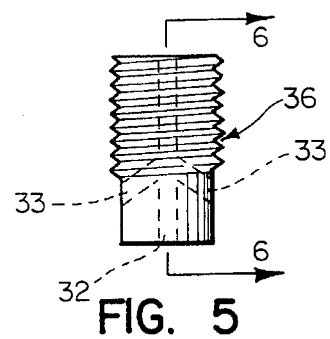
FIG. 5 is a side elevation view of a pipe plug with nozzles drilled therein.
Figure 8:
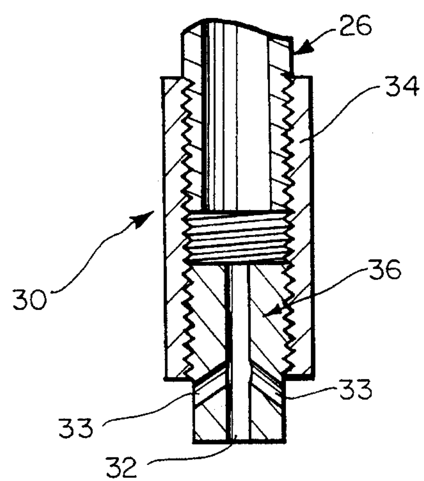
FIG. 8 is a vertical section of the pressure tip taken on line 8—8 of FIG. 7.
Figure 7:
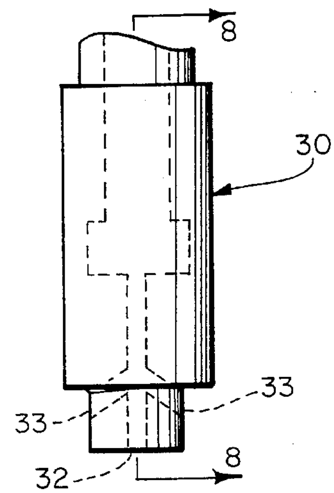
FIG. 7 is a side elevation view of a pressure tip of the invention.
Figure 9:
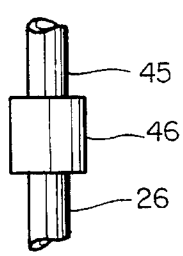
FIG. 9 is a fragmentary side elevation view of a pipe, coupler, and extension pipe.

A pressure tip 30 is attached to the forward end of cylindrical pipe 26 (the end opposite that to which manifold 24 is attached) such as by threading it onto the end of the cylindrical pipe 26. The pressure tip serves as a drill head for the cylindrical pipe 26 and provides one or more nozzles for the flow of fluid from the forward end of cylindrical pipe 26. In the illustrated embodiment, the pressure tip is made up of an internally threaded pipe coupler 34 and an externally threaded pipe plug 36 as shown in FIGS. 7 and 8. The pipe coupler 34 is an internally threaded sleeve as shown in FIGS. 3 and 4. The pipe plug 36 is an externally threaded cylindrical piece of galvanized steel as shown in FIGS. 5 and 6. A pressure hole or nozzle 32 approximately 1/16" in diameter, is drilled centrally through the pipe plug 36 as shown FIGS. 5, 6, 7, and 8, and similarly sized pressure holes or nozzles 33 are drilled at an angle to extend from the central hole 32 to the sides of the pipe plug 36. Generally, three of four holes 33 will be provided spaced evenly around the side or circumference of pipe plug 36 and directed downward at an angle of approximately thirty degrees from the horizontal. The pressure tip 30 is formed by threading the drilled pipe plug 36 into pipe coupler 34 as shown in FIG. 8. This pressure tip 30 is then threaded into external threads on the forward end of the cylindrical pipe 26 as shown in FIG. 8. The pressure tip could alternatively be formed of a galvanized steel nipple 38, FIG. 2, through which a central or axial pressure hole or nozzle 39 and angled side pressure holes or nozzles 40 are drilled. Pressure holes, 1/16" in diameter, have been found to be satisfactory. The nipple is threaded onto the threaded end of cylindrical pipe The hollow cylindrical pipe 26 is used as a drill so that pipe 26 is inserted through ground 41 from the surface to a site 42 of underground contamination. The site of contamination may be an area of soil, an area of buried waste, or an area of underground water. When the site of contamination is reached, pipe 26 is used to deliver the remediation materials such as nutrients, bacteria, and oxygen to the site for purposes of remediating the site. Hollow cylindrical pipe 26 may be a length of standard 3/8" outside diameter galvanized steel pipe; however, any metal or other material strong enough to be inserted into the ground in the manner described can be used. Manifold 24 may also be a length of standard 3/8" outside diameter galvanized steel pipe, or other material similar to that used for pipe 26. For drilling, in the embodiment shown, water from tank 20 under pressure is supplied to the hollow cylindrical pipe 26 and exits the forward end of the pipe as a plurality of high pressure streams of fluid. One stream extends axially from the end of the pipe (the stream formed by nozzle 32 in FIGS. 7 and 8 or nozzle 39 in FIG. 2) and other streams extend at an outward angle from the forward end of the pipe (the streams formed by nozzles 33 in FIGS. 7 and 8 or nozzles 40 in FIG. 2). These high pressures streams of fluid extending from the forward end of pipe 26 cut into and loosen the ground immediately adjacent the forward end of pipe 26 and form a hole therein. Forward end of pipe 26 is then easily moved into this hole or loosened area and the high pressure streams of fluid begin cutting and loosening additional ground now adjacent the forward end of pipe 26. This drilling (cutting and loosening of the ground) and movement of pipe 26 into the cut and loosened ground proceeds on a continuous basis to the desired depth or until the length of pipe is inserted into the ground through most of its length. If not yet to the site of contamination, the flow of water is shut off; the manifold 24 is removed from the end of pipe 26; and another length of pipe 45, FIG. 9, is added to pipe 26. This is done by threading a pipe coupler 46 onto the end of pipe 26 and threading an end of pipe 45 into coupler 46. The manifold 24 is then connected to the other end of pipe 45 and water fed to the pipe to begin again drilling. This procedure continues until the site of contamination is reached.

Since the pipe 26 is handled manually by an operator on site, the length of pipe 26 has to be such that pipe 26, together with attached manifold 24, manifold valves 21, 22, and 23 and adjacent portions of hoses 8 can be carried by and manipulated by the operator. Further, for drilling, the pipe 26 is generally initially placed substantially vertically with the pressure tip 30 resting on the surface of the ground so, in that position, the operator should be able to reach the manifold 24 and manifold valves 21, 22, and 23. Thus, pipe 26 will generally be provided in lengths of between three to five feet. While the weight of the pipe, manifold, and valves will generally be sufficient to cause the forward end of the pipe to move downwardly into the cut and loosened area, in some instances, an operator may need to exert some downward force onto the pipe. This is easily done by exerting downward force on manifold 24 which acts as a handle. Typically, the cylindrical pipe 26 may be extended to reach a depths up to approximately 20 ft.

In the operation of the apparatus as illustrated, the apparatus is moved to the ground surface over a site of contamination to be remediated. The site will have been previously identified through geological sampling or other methods. Generally, all valves will be closed. Prior to moving the apparatus to the site, the water tank 20 is filled with water (after it has been filtered with a carbon filter) to a level in the tank to leave room for pressurization. Where bacteria is used for the remediation, hydrogen peroxide, a source of oxygen for bacteria, will be mixed with the water. The bacteria tank 16 will be filled to an appropriate level with bacteria solution, and nutrient tank 18 will be filled to an appropriate level with a nutrient solution. When at the site, compressor 10 is operated to pump atmospheric air through pressure hoses 6 into the water, bacteria, and nutrient tanks to pressurize the tanks. Typically, the tanks are pressurized generally to about 100 p.s.i. depending on the type of soil to be drilled; however, pressures of up to 200 p.s.i. can be used. Compressor 10 is maintained in operable condition during use of the apparatus to maintain pressure to the desired level. Water to activate and dilute the bacteria in tank 16 is filtered through carbon filter 14 to remove chlorine and may be added on site if water is available, or may be added in advance. (Water added to the nutrient tank and to the water tank is also filtered through carbon.) Pipe 26 and manifold 24 connected thereto is moved from the vehicle to the desired location for drilling. The operator positions pipe 26 in a vertical position with pressure tip 30 resting on the surface. With valve 29 open, valve 23 is opened to allow the water under pressure to flow from water tank 20 into pipe 26 and form streams of pressurized water flowing from pressure tip 30. The operator holds and stabilizes pipe 26 as it is inserted into the ground as described. (Tanks may be replenished at the site. To do so, the appropriate valve from valves 4, FIG. 1, is closed; then the corresponding valve from valves 7 is opened to release pressure to the atmosphere without releasing the pressure from the other tanks; a cap to the appropriate tank is opened to allow for water or remediation materials to be added as needed. Then valve 7 of the appropriate tank is closed; corresponding valve 4 is opened to allow for normal operation of drilling or remediation.)

When the length of pipe 26 has been inserted into the ground through most of its length and it is desired to add an additional length for further drilling, valves 23 and 29 may be closed to stop the drilling process, valves 21, 22, 27, and 28 already being closed. There are quick-disconnect valves between valves 21 and 27, between valves 22 and 28, and between valves 23 and 29. By disconnecting the quick-disconnect value between valves 21 and 27 allows the manifold 24 to be unscrewed from the end of pipe 26, without spillage of material. Then pipe coupler 46, FIG. 9, and extension pipe 45, can be threaded onto the end of pipe 26. Manifold 24 is then threaded onto the end of extension pipe 45; hose 8 from water tank 20 is reconnected to valve 23; then valves 23 and 29 are reopened to allow pressurized water to flow into pipes 45 and 26 to continue drilling. This procedure is repeated to add additional extension pipes to continue drilling as is necessary. If the ground is such that the pipe 26 can be rotated in the ground, extension pipe can be added by merely shutting off valve 23; then the manifold 24 is removed from pipe 26 by unscrewing pipe 26 while pipe 26 is still in the ground; extension pipe 45 is attached by threading it onto pipe 26; the extended pipe 26 is then re-attached to the manifold 24 by threading pipe 26 onto the manifold 24 while pipe 26 is still in the ground.

If not already connected, when the site of contamination is reached, hoses 8 from the bacteria tank 16 to valve 21 and from the nutrients tank be to valve 22 are connected. Valves 27, 28, and 29 are opened; the operator then opens manifold valves 21, 22, and 23 to allow bacteria, nutrients, and water to flow to the site of contamination. This mixture of bacteria, nutrients, and water flow as pressurized streams into and mix with the contaminated soil, waste, or water. Pipe 26 will usually be stabilized or held so it does not continue to be inserted into the ground and the remediation materials are allowed to build up in the contaminated material. However, at this point, continued drilling through the site of contamination by using the remediation materials (as a drill medium) or partial withdrawal of the pipe 26 provides remediation materials at different levels. Typically, in sandy soil, the cylindrical pipe 26 is drilled to the top of the site of contamination and the remediation materials are allowed to flow down through the contamination. In fine soil, the cylindrical pipe 26 is drilled to the bottom of the site of contamination and the remediation materials are injected from the bottom up by repeated applications as pipe 26 is withdrawn. In other ground constituents, such as clay or crushed hard rock, the pipe 26 is drilled to a position and remediation materials injected as determined best under the circumstances for the type of contamination present.

In the illustrated embodiment, after the desired volume of remediation materials have been injected into the site at a particular drill location, manifold valves 21, 22, and 23 are closed to stop the flow of remediation materials. Hoses 8 are removed from manifold valves 21, 22, and 23 after the quick-disconnect valves associated with each have been turned off. Manifold 24 is then used to lift and withdraw extension pipes 45 and pipe 26 with manifold 24 being unscrewed from the pipe each time an extension pipe is to be removed. After removal of pipe 26, pipe 26 is ready to be drilled into the site of contamination at a different location. Hoses 8 are then re-attached to manifold valves 21, 22, and 23; then the drilling process and remediation process is repeated at the different location. This drilling and injection of remediation are repeated at various locations over the site of contamination until the site of contamination has been completely treated. Remediation materials are left in the ground and are not removed. The pipes and hoses are then placed on the vehicle and moved to a new site or to a base of operation where the tanks can be refilled.

For bacteria remediation, the remediation materials are bacteria and nutrients. Oxygen, along with the bacteria and nutrients, is necessary in order to create and maintain an aerobic condition within the underground contaminated soil or water. Oxygen may be injected into the site with the nutrients and bacteria. With the apparatus shown, oxygen is supplied by hydrogen peroxide. As previously indicated, it is preferred that the hydrogen peroxide be mixed with the water and then injected into the ground during drilling and along with the bacteria and nutrients. This provides the necessary oxygen.

While the invention has been described in connection with bacteria remediation, the invention can be used with various types of remediation materials that can be injected into sites of underground contamination. Further, while a compressor has been shown for pressurizing the drilling and remediation materials, other pressure sources could be used. In addition, different pressures can be used in connection with drilling and in connection with remediation material injection.

While the present invention has been disclosed in connection with the preferred embodiment thereof, it should be understood that there may be other embodiments which fall within the spirit and scope of the invention as defined by the following claims.

I claim:

1. Apparatus for delivery of remediation materials to underground contaminated soils and water, comprising:

- a water tank for holding water under pressure;
- a remediation materials tank for holding remediation materials under pressure;
- a compressor to deliver pressurized air to said water tank and to said remediation materials tank to pressurize said tanks;
- a hollow cylindrical pipe for drilling to a site of underground contamination and for delivering remediation materials to the site of the underground contamination;
- a pressure tip attached to one end of said hollow cylindrical pipe; and
- means selectively connecting the water tank and remediation materials tank, respectively, to the hollow cylindrical pipe so that when the water tank is connected to the hollow cylindrical pipe, water under pressure flows from the water tank to the hollow cylindrical pipe and from the pressure tip as a pressurized stream, the pressurized stream being capable of drilling into ground to allow the hollow cylindrical pipe to be inserted into the ground behind the pressurized stream to the site of underground contamination, and when the remediation materials tank is connected to the hollow cylindrical pipe, remediation materials flow from the remediation materials tank to the hollow cylindrical pipe and from the pressure tip.

2. Apparatus according to claim 1, wherein the water tank, remediation materials tank, and compressor are mounted on a vehicle for transport to a surface location above the site of underground contamination, and the means selectively connecting the water tank and remediation materials tank, respectively, to the hollow cylindrical pipe includes flexible hoses whereby the hollow cylindrical pipe is movable away from the vehicle.

3. Apparatus according to claim 1, wherein the means selectively connecting the water tank and the remediation materials tank, respectively, to the hollow cylindrical pipe includes a manifold connected to the hollow cylindrical tank, a flow control valve between the manifold and the water tank, and a flow control between the manifold and the remediation materials tank.

4. Apparatus according to claim 3, wherein the manifold is removably connected directly to the hollow cylindrical pipe at the end thereof opposite the pressure tip.

5. Apparatus according to claim 4, wherein the manifold serves as a handle for manipulating the hollow cylindrical pipe.

6. Apparatus according to claim 4, wherein the flow control valves are connected directly to the manifold.

7. Apparatus according to claim 6, wherein the means selectively connecting the water tank and remediation materials tank, respectively, to the hollow cylindrical pipe includes at least one additional flow control valve between the manifold and the water tank, and at least one additional flow control valve between the manifold and remediation materials tank.

8. Apparatus according to claim 7, wherein the remediation materials tank includes two separate tanks, and wherein the means selectively connecting the water tank and remediation materials tank, respectively, to the hollow cylindrical pipe, separately connects each of the separate remediation materials tanks to the manifold.

9. Apparatus according to claim 8, wherein the pressure tip includes a pipe coupler threaded onto the one end of the hollow cylindrical pipe leaving an open end of the pipe coupler, a pipe plug threaded into the open end of the pipe coupler, and a central hose extending through the pipe plug to form a nozzle.

10. Apparatus according to claim 9, wherein the plug additionally includes a plurality of angled bases forming additional nozzles.

11. Apparatus according to claim 8, wherein the pressure tip includes a pipe nipple threaded onto and over the one end of the hollow cylindrical pipe, and at least one bore extending through the nipple to form at least one nozzle.

12. Apparatus for delivery of remediation materials to an underground site of contamination, comprising:

a source of pressurized drilling fluid;

a source of pressurized remediation materials;

a length of pipe for insertion into the ground from the surface to the site of contamination, the pipe having a forward end;

means for selectively connecting the source of pressurized drilling fluid to the pipe so that when connected to the pipe the drilling fluid is forced, as a pressurized stream, from the forward end of the pipe, whereby the pressurized stream will drill a hole through the ground as the forward end of the pipe is inserted into the ground; and means for selectively connecting the source of remediation materials flow from the forward end of the pipe.

13. A method for delivery of remediation materials to underground contaminated soils and water comprising:

obtaining a length of hollow cylindrical pipe;

forcing a drilling fluid as at least one high pressure stream from the forward end of the hollow cylindrical pipe into the ground adjacent to the forward end of the hollow cylindrical pipe to drill into such adjacent ground;

continually inserting the pipe into the drilled adjacent ground to move the pipe into the ground toward an area of underground contamination and present new ground to be drilled adjacent to the forward end of the pipe until the site of contamination is reached by the forward end of the pipe;

with the forward end of the pipe in the site of contamination, forcing remediation materials from the forward end of the pipe into the site of contamination.

14. A method for delivery of remediation materials to underground contaminated soils and water according to claim 13, wherein the step of forcing a drilling fluid from the forward end of the hollow cylindrical pipe includes the steps of providing a drilling fluid tank, pressurizing the drilling fluid tank, and connecting the drilling fluid tank to the hollow cylindrical pipe so that pressurized drilling fluid flows from the drilling fluid tank to the hollow cylindrical pipe.

15. A method for delivery of remediation materials to underground contaminated soils and water according to claim 13, wherein the step of forcing remediation materials from the forward end of the hollow cylindrical pipe into the site of contamination includes the steps of providing at least one remediation materials tank, pressurizing the at least one remediation materials tank, and connecting the at least one remediation materials tank to the hollow cylindrical pipe so that pressurized remediation materials flow from the at least one remediation materials tank to the hollow cylindrical pipe.

16. A method for delivery of remediation materials to underground contaminated soils and water according to claim 15, wherein the steps of connecting the drilling fluid tank to the hollow cylindrical pipe and connecting the at least one remediation materials tank to the hollow cylindrical pipe include the step attaching a manifold to the hollow cylindrical pipe and attaching the drilling fluid tank and the at least one remediation materials tank, through respective hoses and valves, to the manifold whereby the valves are operated to selectively connect the drilling fluid tank and the at least one remediation materials tank to the hollow cylindrical pipe.

17. A method for delivery of remediation materials to underground contaminated soils and water according to claim 16, wherein the length of hollow pipe is made up of sections, and the step of continually inserting the pipe into the drilled adjacent ground includes the steps of attaching a manifold to a section of hollow cylindrical pipe of a length to be handled by an operator, forcing a drilling fluid as at least one high pressure stream from the forward end of the section of hollow cylindrical pipe, continually inserting the section of pipe into the drilled adjacent ground until the section of pipe is inserted into the ground a desired distance, discontinuing the forcing of drilling fluid from the forward end of the section of pipe, disconnecting the manifold from the section of pipe, connecting an additional section of pipe that has been inserted into the ground, attaching the manifold to the additional section of pipe, resuming the step of forcing the drilling fluid from the forward end of the pipe and continually inserting the section of pipe and the additional section of pipe into the drilled adjacent ground, and repeating steps of disconnecting the forcing of drilling fluid, disconnecting the manifold from the section of pipe, connecting an additional section of pipe to the pipe in the ground, attaching the manifold to the additional section of pipe, forcing drilling fluid from the forward end of the pipe and continually inserting the pipe and additional sections into the drilled adjacent ground until the site of contamination is reached.

* * * * *